United States Patent
Tamura et al.

(10) Patent No.: US 6,463,734 B1
(45) Date of Patent: Oct. 15, 2002

(54) EXHAUST EMISSION CONTROL DEVICE OF INTERNAL COMBUSTION ENGINE

(75) Inventors: Yasuki Tamura, Nisshin; Osamu Nakayama, Toyota; Tetsuya Watanabe; Kazuhito Kawashima, both of Okazaki, all of (JP)

(73) Assignee: Mitsubishi Jidosha Kogyo Kabushiki Kaisha (JP)

( * ) Notice: Subject to any disclaimer, the term of this patent is extended or adjusted under 35 U.S.C. 154(b) by 0 days.

(21) Appl. No.: 09/651,653

(22) Filed: Aug. 30, 2000

(30) Foreign Application Priority Data

Aug. 30, 1999 (JP) .......................................... 11-242688

(51) Int. Cl.$^7$ ................................................ F01N 3/00
(52) U.S. Cl. ............................. 60/277; 60/285; 60/297
(58) Field of Search ........................ 60/274, 276, 277, 60/285, 286, 297, 295

(56) References Cited

U.S. PATENT DOCUMENTS

| | | | | |
|---|---|---|---|---|
| 5,341,642 A | * | 8/1994 | Kurihara et al. | 60/276 |
| 5,426,934 A | * | 6/1995 | Hunt et al. | 60/278 |
| 5,740,676 A | * | 4/1998 | Agustin et al. | 60/276 |
| 5,758,491 A | * | 6/1998 | Agustin et al. | 60/274 |
| 5,970,707 A | * | 10/1999 | Sawada et al. | 60/277 |
| 6,185,929 B1 | * | 2/2001 | Ishizuka et al. | 60/274 |

FOREIGN PATENT DOCUMENTS

JP 5-59935 3/1993

* cited by examiner

Primary Examiner—Thomas Denion
Assistant Examiner—Binh Tran
(74) Attorney, Agent, or Firm—Rossi & Associates

(57) ABSTRACT

An exhaust emission control device of an internal combustion engine, which purifies exhaust gas exhausted from the internal combustion engine, comprises: a catalyst device composed of a three way catalyst for purifying harmful substance in the exhaust gas when an exhaust air-fuel ratio is substantially stoichiometrical and an NOx catalyst having a function of absorbing NOx in the exhaust gas when the air-fuel ratio is closer to a lean air-fuel ratio than to the stoichiometrical air-fuel ratio, the catalyst device being provided in an exhaust passage of the internal combustion engine; catalyst deterioration determination means for determining deterioration state of the catalyst device, the deterioration resulting from at least temperature; and control means for deteriorating exhaust gas components flowing into the catalyst device much more than exhaust gas components flowing into the catalyst device when an air-fuel ratio of a mixture supplied to the internal combustion engine is substantially stoichiometrical, if the catalyst deterioration determination means determines that the catalyst device is in a predetermined deterioration state. The deterioration of an NOx absorbing function of the NOx catalyst results from at least the destabilization of absorbing material in the NOx catalyst, which is caused by the rise in the temperature. Thus, if the catalyst deterioration determination means determines that the catalyst device is in the predetermined deterioration state, the exhaust gas components flowing into the catalyst device are deteriorated much more than the exhaust gas components flowing into the catalyst device when the air-fuel ratio of the mixture supplied to the internal combustion engine is substantially stoichiometrical. Therefore, CO, H2, NOx, O2, THC and the like are supplied to the absorbing material to thereby stabilize the absorbing material as carbonate, nitrite or acid oxide. This prevents the heat deterioration. This extends a heat-resisting life of the catalyst device, and prevents the deterioration of an exhaust gas characteristic and the increase in cost.

5 Claims, 8 Drawing Sheets

EXHAUST EMISSION CONTROL DEVICE OF INTERNAL COMBUSTION ENGINE

BACKGROUND OF THE INVENTION

1. Field of the Invention

The present invention relates to an exhaust emission control device of an internal combustion engine, in which a three way catalyst and a catalyst with an NOx absorbing function are disposed in an exhaust gas passage.

2. Description of Related Art

In recent years, a lean burn internal combustion engine which improves fuel economy by running the internal combustion engine at a lean air-fuel ratio has been put to practical use. If the lean burn internal combustion engine is run at the lean air-fuel ratio, a three way catalyst cannot sufficiently purify NOx (nitrogenous substance) in exhaust gas due to its purifying characteristic. To address this problem, an exhaust emission control catalyst device provided with an absorption-type NOx catalyst, which absorbs NOx in exhaust gas while the engine is run at the lean air-fuel ratio and emits and reduces the absorbed NOx while the engine is run at a stoichiometrical air-fuel ratio or a rich air-fuel ratio, has been adopted recently.

The absorption-type NOx catalyst has the characteristics of absorbing NOx in exhaust gas as nitrate (or acid oxide) in an atmosphere with excessive oxygen of exhaust gas, and emitting the absorbed NOx in an atmosphere mainly with excessive carbon monoxide of exhaust gas and reducing the NOx into nitrogen (N2) (carbonate is produced at the same time).

In the internal combustion engine, the three way catalyst is provided at the upstream of an exhaust passage in order to control the exhaust of a large amount of uncombusted HC generated when the engine is cold-started. The three way catalyst, however, ordinarily carries a noble metal (e.g., platinum and rhodium), and the noble metal is oxidized to deteriorate the catalyst performance (heat deterioration) when the exhaust gas becomes a lean atmosphere with a high temperature. Therefore, for the exhaust emission control device in which the catalyst with a three way function is disposed in the exhaust passage, Japanese Patent Provisional Publication No. 5-59935 has proposed an air-fuel ratio control for preventing the heat deterioration by making the exhaust air-fuel ratio stoichiometrical if the catalyst is exposed to a predetermined high temperature in oxide atmosphere.

In the lean burn internal combustion engine, the three way catalyst and the NOx absorption-type catalyst are provided in the exhaust passage. The three way catalyst and the absorption-type NOx catalyst have different deterioration characteristics such as heat deterioration characteristic. For this reason, a technique for effectively controlling the deterioration by using both the three way catalyst and the NOx absorption-type catalyst has not yet been established.

More specifically, the three way catalyst and the NOx absorption-type catalyst differ in their heat-resisting temperatures. Controlling the deterioration of one catalyst may proceed the deterioration of other catalyst. More specifically, the three way catalyst is oxidized and deteriorated when it is exposed to a high temperature and the exhaust gas becomes the lean atmosphere. To address this problem, it is necessary to control the air-fuel ratio in such a manner as to make the exhaust air-fuel ratio stoichiometrical when the three way catalyst is exposed to a high temperature in the oxide atmosphere. The heat-resisting temperature of the absorption-type NOx catalyst, however, is lower than that of the three way catalyst. Thus, if the absorption-type NOx catalyst is exposed to a high temperature and the exhaust gas becomes a stoichiometric atmosphere to reduce CO and THC (the generic name for hydrocarbon substance), absorbing material thereof never becomes carbonate or nitrite (or acid oxide) and is destabilized. Therefore, the absorbing material cannot absorb the NOx by combining with a carrier (deterioration).

Particularly if the flow rate of exhaust gas is high, the oxidization of the three way catalyst advances the deterioration, and if the flow rate of exhaust gas is low, there is a shortage of CO, THC and the like to thereby advance the deterioration of the absorption-type NOx catalyst.

SUMMARY OF THE INVENTION

It is therefore an object of the present invention to provide an exhaust emission control device of an internal combustion engine, which can prevent the deterioration such as heat deterioration of the three way catalyst and the absorption-type NOx catalyst to thereby prevent the deterioration of an exhaust gas characteristic and the increase in cost.

The above object can be accomplished by providing an exhaust emission control device of an internal combustion engine, which purifies exhaust gas exhausted from the internal combustion engine; the exhaust emission control device comprising: a catalyst device composed of a three way catalyst for purifying harmful substance in the exhaust gas when an exhaust air-fuel ratio is substantially stoichiometrical and an NOx catalyst having a function of absorbing NOx in the exhaust gas when the air-fuel ratio is closer to a lean air-fuel ratio than to the stoichiometrical air-fuel ratio, the catalyst device being provided in an exhaust passage of the internal combustion engine; catalyst deterioration determination means for determining deterioration state of the catalyst device, the deterioration resulting from at least temperature; and control means for deteriorating exhaust gas components flowing into the catalyst device much more than exhaust gas components flowing into the catalyst device when an air-fuel ratio of a mixture supplied to the internal combustion engine is substantially stoichiometrical, if the catalyst deterioration determination means determines that the catalyst device is in a predetermined deterioration state.

The deterioration of an NOx absorbing function of the NOx catalyst results from at least the destabilization of absorbing material in the NOx catalyst, which is caused by the increase in the temperature. Thus, if the catalyst deterioration determination means determines that the catalyst device is in the predetermined deterioration state, the exhaust gas components flowing into the catalyst device are deteriorated much more than the exhaust gas components flowing into the catalyst device when the air-fuel ratio of the mixture supplied to the internal combustion engine is substantially stoichiometrical. Therefore, CO, H2, NOx, O2, THC and the like are supplied to the absorbing material to thereby stabilize the absorbing material as carbonate, nitrite or acid oxide. This prevents the heat deterioration, extends a heat-resisting life of the catalyst device, and prevents the deterioration of an exhaust gas characteristic and an increase in expense.

In one preferred mode of the present invention, the exhaust emission control device of the internal combustion engine further comprises: catalyst temperature sensing means for sensing or estimating a temperature of the catalyst device; and wherein the catalyst deterioration determination means determines that the catalyst device is in a predetermined deterioration state if a catalyst temperature sensed or estimated by the catalyst temperature sensing means is in excess of a heat-resisting temperature of the catalyst device.

In one preferred mode of the present invention, the exhaust emission control device of the internal combustion engine further comprises: catalyst temperature sensing means for sensing or estimating a temperature of the NOx catalyst; and wherein the catalyst deterioration determination means determines that the catalyst device is in a predetermined deterioration state if a temperature of the NOx catalyst sensed or estimated by the catalyst temperature sensing means is in excess of a heat-resisting temperature of the NOx catalyst.

In one preferred mode of the present invention, the control means prohibits the air-fuel ratio of the mixture supplied to the internal combustion engine from being substantially stoichiometrical in order to deteriorate the exhaust gas components.

In one preferred mode of the present invention, the exhaust emission control device of the internal combustion engine further comprises: catalyst temperature sensing means for sensing or estimating a temperature of the catalyst device; and air-fuel ratio control means for making the air-fuel ratio of the mixture supplied to the internal combustion engine substantially stoichiometrical according to the temperature of the catalyst device sensed or estimated by the catalyst temperature sensing means when a temperature of the three way catalyst is not less than a predetermined temperature; and wherein the catalyst deterioration determination means determines that the catalyst device is in a predetermined deterioration state according to the temperature of the catalyst device sensed or estimated by the catalyst temperature sensing means when the temperature of the NOx catalyst is in excess of a heat-resisting temperature of the NOx catalyst; and the control means prohibits the air-fuel ratio of the mixture supplied to the internal combustion engine from being substantially stoichiometrical when the catalyst deterioration determination means determines that the catalyst device is in a predetermined deterioration state when the air-fuel ratio control means is operating.

In this case, the air-fuel ratio of the mixture supplied to the internal combustion engine is made substantially stoichiometrical when the temperature of the three way catalyst is not less than a predetermined temperature. This lowers the temperature of the exhaust gas and prevents the heat deterioration of the three way catalyst. If the temperature of the NOx catalyst exceeds the heat-resisting temperature of the NOx catalyst during the air-fuel ratio control, the control means prohibits the air-fuel ratio of the mixture supplied to the internal combustion engine from being substantially stoichiometrical. Thus, the exhaust air-fuel ratio is made lean or rich, and CO, H2, NOx, O2, THC and the like are supplied to the NOx absorbing material of the NOx catalyst. This stabilizes the NOx absorbing material, and prevents the heat deterioration of the NOx catalyst.

In one preferred mode of the present invention, the exhaust emission control device of the internal combustion engine further comprises: deterioration parameter finding means for finding a deterioration parameter of the three way catalyst and a deterioration parameter of the NOx catalyst; first deterioration determination means for determining that the three way catalyst is in a predetermined deterioration state when the deterioration parameter of the three way catalyst found by the deterioration parameter finding means is in excess of a reference value that is preset for the three way catalyst; and second deterioration determination means for determining that the NOx catalyst is in a predetermined deterioration state when the deterioration parameter of the NOx catalyst found by the deterioration parameter finding means is in excess of a reference value that is preset for the NOx catalyst; and wherein if the first deterioration determination means determines that the three way catalyst is in a predetermined deterioration state, the control means prohibits the air-fuel ratio of the mixture supplied to the internal combustion engine from being the lean air-fuel ratio, and if the second deterioration determination means determines that the NOx catalyst is in a predetermined deterioration state, the control means prohibits the air-fuel ratio of the mixture supplied to the internal combustion engine from being substantially stoichiometrical.

In this preferred mode, one catalyst, which has a higher deterioration parameter, i.e., one catalyst, which is deteriorated more easily, is given priority in the prevention of the deterioration. If both catalysts have high deterioration parameters, the internal combustion engine is prohibited from operating at the lean air-fuel ratio and the substantially stoichiometrical air-fuel ratio, and this prevents the deterioration resulting from the oxidization of the three way catalyst and the deterioration resulting from the destabilization of the absorbing material in the NOx catalyst. Moreover, the operation of the internal combustion engine at the rich air-fuel ratio can be reduced to the minimum level, and this controls the deterioration of the fuel economy.

In one preferred mode of the present invention, the deterioration parameter finding means finds the deterioration parameter of the three way catalyst by using an deterioration index corresponding to a temperature of the three way catalyst, and finds the deterioration index of the NOx catalyst by using a deterioration index corresponding to a temperature of the NOx catalyst.

In one preferred mode of the present invention, the deterioration index corresponding to the temperature of the three way catalyst indicates that the higher the temperature of the three way catalyst is, the larger the deterioration degree of the three way catalyst is, and the deterioration index corresponding to the temperature of the NOx catalyst indicates that the higher the temperature of the NOx catalyst is, the larger the deterioration degree of the NOx catalyst is.

In one preferred mode of the present invention, the deterioration index finding means finds the deterioration index of the three way catalyst by using at least either one of an deterioration index corresponding to a flow rate of exhaust gas flowing into the three way catalyst and an deterioration index corresponding to components of exhaust gas flowing into the three way catalyst and a deterioration index corresponding to a temperature of the three way catalyst, and finds the deterioration index of the NOx catalyst by using at least either one of a deterioration index corresponding to a flow rate of the NOx catalyst and a deterioration index corresponding to components of exhaust gas flowing into the NOx catalyst and a deterioration index corresponding to a temperature of the NOx catalyst.

It is therefore possible to determine the degree of the deterioration according to factors such as the temperature, the flow rate of the exhaust gas and the exhaust gas components, which are closely related to the deterioration of the catalyst device. This enables the correct determination about the deterioration state and the proper treatment for the determined deterioration state.

In one preferred mode of the present invention, the deterioration index corresponding to the flow rate of exhaust gas flowing into the three way catalyst indicates that the hither the flow rate of the exhaust gas is, the larger the deterioration degree of the three way catalyst is; the deterioration index corresponding to the components of the exhaust gas flowing into the three way catalyst indicates that the leaner the exhaust air-fuel ratio is, the larger the deterioration degree of the three way catalyst is; the deterioration index corresponding to the temperature of the three way catalyst indicates that the higher the temperature of the three way catalyst is, the deterioration degree of the three way catalyst is; the deterioration index corresponding to the flow rate of the exhaust gas flowing into the NOx catalyst indicates that the lower the flow rate of the exhaust gas is, the larger the deterioration degree of the NOx catalyst is; the deterioration index corresponding to the components of the exhaust gas flowing into the NOx catalyst indicates that the closer the exhaust air-fuel ratio is to the stoichiometrical air-fuel ratio, the larger the deterioration degree of the NOx catalyst is; and the deterioration index corresponding to the temperature of the NOx catalyst indicates that the higher the temperature of the NOx catalyst is, the larger the deterioration degree of the NOx catalyst is.

The above object can also be accomplished by providing an exhaust emission control device of an internal combustion engine, which purifies exhaust gas exhausted from the internal combustion engine, the exhaust emission control device comprising: a catalyst device composed of a three way catalyst for purifying harmful substance in the exhaust gas when an exhaust air-fuel ratio is substantially stoichiometrical and an NOx catalyst having a function of absorbing NOx in the exhaust gas when the air-fuel ratio is closer to a lean air-fuel ratio than to the stoichiometrical air-fuel ratio, the catalyst device being provided in an exhaust passage of the internal combustion engine; operating state setting means for selecting and setting an operating state from a plurality of operating states including a lean air-fuel ratio operating state wherein a mixture supplied to the internal combustion engine is closer to a lean air-fuel ratio than to a stoichiometrical air-fuel ratio and a rich air-fuel operating state wherein a mixture supplied to the internal combustion engine is closer to a rich air-fuel ratio than to the stoichiometrical air-fuel ratio according to a parameter correlating to a temperature of the catalyst device and a parameter correlating to a flow rate of exhaust gas flowing into the catalyst device; and control means for controlling the mixture of the internal combustion engine according to the operating state set by the operating state setting means.

This exhaust emission control device selects a suitable operating state according to the temperature and the flow rate of the exhaust gas in conformance with the deterioration characteristics of the catalysts to thereby reduce the deterioration of the fuel economy and control the deterioration of both the three way catalyst and the NOx catalyst.

In one preferred mode of the present invention, the operating state setting means sets an air-fuel ratio operating state for the three way catalyst according the parameter correlating to the temperature of the three way catalyst and the parameter correlating to the flow rate of the exhaust gas flowing into the three way catalyst, and sets an air-fuel ratio operating state for the NOx catalyst according to the parameter correlating to the temperature of the NOx catalyst and the parameter correlating to the flow rate of the exhaust gas flowing into the NOx catalyst, and if these two air-fuel ratio operating states are different, the operating state setting means selects a leaner air-fuel ratio operating state.

In one preferred mode of the present invention, a temperature region of the NOx catalyst, where the air-fuel ratio operating state for the NOx catalyst selected by the operating state setting means switches to a richer air-fuel ratio operating state, is shifted to a higher temperature side as the flow rate of the exhaust gas is decreased.

The absorbing material of the NOx catalyst is stabilized as nitrite (or acid oxide) at the lean exhaust air-fuel ratio. For this reason, it is possible to prevent the emission of oxygen or NOx and maintain the stable state of the absorbing material by switching the operating state to the richer air-fuel ratio operating state at the high temperature.

In one preferred mode of the present invention, a temperature region of the NOx catalyst, where the air-fuel ratio operating state for the NOx catalyst selected by the operating state setting means switches to a leaner air-fuel ratio operating state, is shifted to a lower temperature side as the flow rate of the exhaust gas is decreased.

The absorbing material of the NOx catalyst is stabilized as carbonate at the rich exhaust air-fuel ratio. For this reason, it is possible to prevent the emission of carbonate and maintain the stable state of the absorbing material by switching the operating state to the leaner air-fuel ratio operating state at the low temperature.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

The first embodiment of the present invention will be described in detail hereinbelow.

Figure 1:
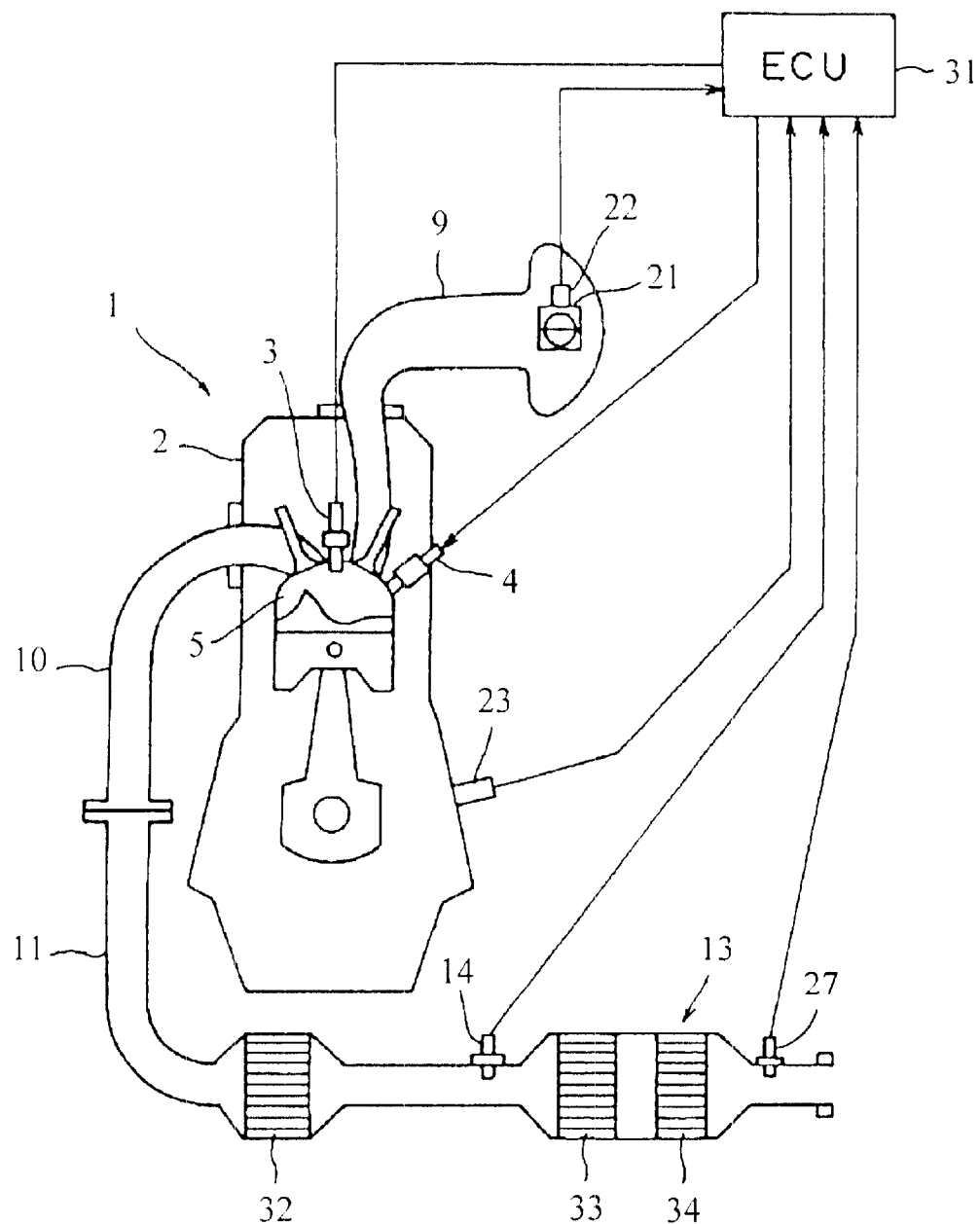
FIG. 1 is a schematic diagram showing the structure of an exhaust emission control device of an internal combustion engine according to the first embodiment of the present invention.
Figure 2:
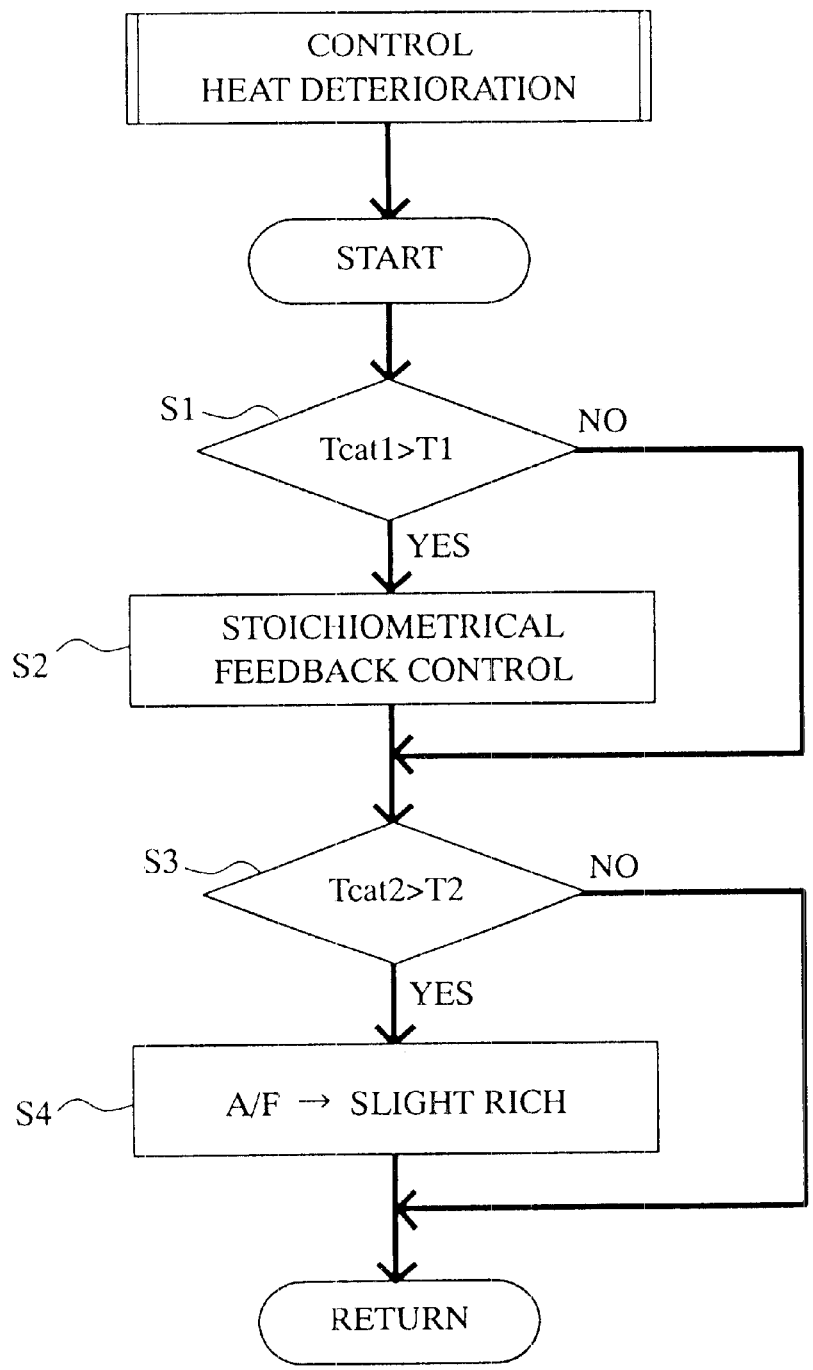
FIG. 2 is a flow chart showing a procedure for controlling deterioration by means of the exhaust emission control device of the internal combustion. engine in FIG. 1.

FIG. 1 is a schematic diagram showing the structure of an exhaust emission control device of an internal combustion engine according to the first embodiment of the present invention, and FIG. 2 is a flow chart of a procedure for controlling heat deterioration by means of the exhaust emission control device of the internal combustion engine according to the first embodiment.

The internal combustion engine (hereinafter referred to as an engine) of the first embodiment is a cylinder fuel injection type spark ignition serial four cylinder engine that is capable of injecting fuel in an intake stroke (an intake stroke injection mode) or in a compression stroke (a compression stroke injection mode) by switching a fuel injection mode (an operating mode). This cylinder fuel injection type engine 1 can easily be run at a substantially stoichiometrical air-fuel ratio, a rich air-fuel ratio and a lean air-fuel ratio. Particularly in the compression stroke injection node, the engine 1 can be run at a super lean air-fuel ratio.

According to the present embodiment, an ignition plug 3 and an electromagnetic fuel injection valve 4 are attached to a cylinder head 2 of each cylinder of the engine 1 as shown in FIG. 1. The fuel injection valve 4 enables the direct injection of fuel into a combustion chamber 5. The fuel injection valve 4 connects to a fuel supply device (a fuel pump) with a fuel tank through a fuel pipe (not shown). A fuel in the fuel tank is supplied to the fuel injection valve 4, which injects the fuel toward the combustion chamber 5 at a desired fuel pressure. In this case, the amount of fuel to be injected is determined according to a fuel discharge pressure of the fuel pump and an opening period (a fuel injecting period) of the fuel injection valve 4.

An intake port is formed in substantially an upright direction in the cylinder head 2 of each cylinder, and one end of an intake manifold 9 is connected to the cylinder head 2 in such a manner as to communicate with each intake port. A drive-by-wire (DBW) electric throttle valve 21 connects to the other end of the intake manifold 9, and the throttle valve 21 is provided with a throttle sensor 22 that senses a throttle opening θth. An exhaust port is formed in substantially a horizontal direction in the cylinder head 2 of each cylinder, and one end of an exhaust manifold 10 connects to the cylinder head 2 in such a manner as to communicate with each exhaust port.

The engine 1 is provided with a crank angle sensor 23 that senses a crank angle. The crank angle sensor 23 is capable of sensing an engine revolution speed Ne. The cylinder fuel injection type engine 1 is known, and thus, the structure thereof will not be described in detail.

The exhaust manifold 10 of the engine 1 connects to an exhaust pipe (an exhaust passage) 11. The exhaust pipe 11 connects to a muffler (not shown) through a small three way catalyst 32 and an exhaust emission control catalyst device 13 in proximity to the engine 1. The three way catalyst 32 is quickly activated by heating by an exhaust gas when the engine 1 is cold-started. The three way catalyst 32 purifies harmful substance (HC, CO, NOx), and has platinum (Pt), rhodium (Rh) and the like as noble metal. A high temperature sensor (a catalyst temperature sensing means) 14 is provided between the three way catalyst 32 and the exhaust emission control catalyst device 13 in the exhaust pipe 11. The high temperature sensor 14 is positioned at the upstream of the exhaust emission control catalyst device 13, i.e., at the upstream of an absorption-type NOx catalyst 33 that will be described later.

The exhaust emission control catalyst device 13 has the absorption-type NOx catalyst 33 and a three way catalyst 34 in order to execute an NOx reducing function of absorbing NOx in exhaust gas when the exhaust air-fuel ratio is the lean air-fuel ratio and a reducing function of purifying harmful substance (HC, CO, NOx) in exhaust gas when the exhaust air-fuel ratio is substantially stoichiometrical. The three way catalyst 34 is disposed closer to the downstream than the absorption-type NOx catalyst 33. When the absorption-type NOx catalyst 33 emits the absorbed NOx, the three way catalyst 34 reduces the NOx that cannot be reduced by the absorption-type NOx catalyst 33 itself The exhaust emission control catalyst device 13 may only be composed of the absorption-type NOx catalyst 33 if the absorption-type catalyst 33 reduces the NOx and has the function (referred to as a three way function here) of the three way catalyst that oxidizes HC and CO. The absorption-type NOx catalyst 33 has a reducing function of absorbing the NOx once in oxide atmosphere (NOx reducing function) and emitting the NOx to reduce it into N2 (nitrogen) and the like in reducing atmosphere where CO mainly exists. More specifically, the absorption-type NOx catalyst 33 has platinum (Pt) and rhodium (Rh) as noble metal, and has alkali metal and alkali earth metal such as barium (Ba) as absorbing material.

An NOx sensor 27 for sensing an NOx concentration is provided at the downstream side of the exhaust emission control catalyst device 13.

An ECU (electronic control unit) 31, which has an input/output device, a storage device (e.g., ROM, RAM and non-volatile RAM), a central processing unit (CPU), a timer counter and the like, is also provided at the downstream side of the exhaust emission control catalyst device 13. The ECU 31 totally controls the exhaust emission control device of the present embodiment including the engine 1. More specifically, a variety of sensors such as the high temperature sensor 14 and the NOx sensor 27 is connected to an input side of the ECU 31. Sensor information from these sensors is input to the input side of the ECU 31. On the other hand, the ignition plug 3, the fuel injection valve 4 and the like are connected to an output side of the ECU 31 through an ignition coil. Optimum values of an fuel injection amount, an ignition timing and the like calculated according to the sensor information from the variety of sensors are outputted to the ignition coil, the fuel injection valve 4 and the like. Therefore, the fuel injection valve 4 injects a proper amount of fuel in a proper timing, and the ignition plug 3 ignites in a proper timing.

Actually, the ECU 31 finds a target cylinder inner pressure, i.e., a target average effective pressure Pe corresponding to an engine load according to the throttle opening information θth from the throttle sensor 22 and the engine revolution speed information Ne from the crank angle sensor 23. Moreover, the ECU 31 determines the fuel injection mode with reference to a map (not shown) according to the target average effective pressure Pe and the engine revolution speed information Ne. If, for example, both the target average effective pressure Pe and the engine revolution speed Ne are low, the fuel injection mode is determined as the compression stroke injection mode so that the fuel can be injected in the compression stroke. On the other hand, if the target average effective pressure Pe or the engine revolution speed Ne is high, the fuel injection mode is determined as the intake stroke injection mode so that the fuel can be injected in the intake stroke.

A target air-fuel ratio (a target A/F) as a control objective is determined according to the target average effective pressure Pe and the engine revolution speed Ne, and a proper injection amount of fuel is determined according to the target A/F. A catalyst temperature Tcat is estimated from exhaust gas temperature information sensed by the high temperature sensor 14. More specifically, a temperature difference map is produced by an experiment and the like according to the target average effective pressure Pe and the engine revolution speed information Ne in order to correct an error resulting from the fact that the high temperature sensor 14 and the absorption-type NOx catalyst 33 are a little apart from each other. The catalyst temperature Tcat is estimated upon determination of the target average effective pressure Pe and the engine revolution speed information Ne.

There will now be described the operation of the exhaust emission control device of the internal combustion engine according to the first embodiment that is constructed in the above-mentioned manner.

The three way catalyst 32 is heated by the exhaust gas and is quickly activated when the engine 1 is cold-started. When the exhaust air-fuel ratio is substantially stoichiometrical, the three way catalyst 32 purifies the harmful substance (HC, CO, NOx) in the exhaust gas.

In the exhaust emission control catalyst device 13, the absorption-type NOx catalyst 33 absorbs the NOx as nitrite in the exhaust gas to purify the exhaust gas in the atmosphere with an excessive oxygen concentration, e.g., while the engine is run at the super lean air-fuel ratio in a lean mode. On the other hand, in the atmosphere with a low oxygen concentration, the nitrite absorbed into the absorption-type NOx catalyst 33 reacts with the CO in the exhaust gas to generate carbonate and the NOx is emitted and reduced. Therefore, as the absorption of the NOx into the absorption-type NOx catalyst 33 proceeds, the air-fuel ratio is made rich or additional fuel is injected to thereby lower the oxygen concentration and supply the CO. Then, the absorption-type NOx catalyst 33 emits the NOx to maintain the NOx reducing function.

As is the case with the three way catalyst 32, the three way catalyst 34 of the exhaust emission control catalyst device 13 purifies the harmful substance (H C, CO, NOx) in the exhaust gas when the exhaust air-fuel ratio is substantially stoichiometrical. When the absorption-type NOx catalyst 33 emits the absorbed NOx, the three way catalyst 34 reduces the NOx that cannot be reduced by the absorption-type NOx catalyst 33 itself.

If the temperature of the exhaust gas, i.e., the temperature of the three way catalyst 32 estimated according to the output of the high temperature sensor 13 is a predetermined temperature or higher, the exhaust emission control device of the internal combustion engine according to the present embodiment executes a stoichiometrical feed back control (air-fuel ratio control means) in such a manner as to control the air-fuel ratio of the engine 1 to the substantially stoichiometrical air-fuel ratio. This lowers the temperature of the exhaust gas, and prevents the heat deterioration of the three way catalyst 32. If the temperature of the absorption-type NOx catalyst 33 estimated according to the output of the high temperature sensor 14 is in excess of a catalyst heat-resisting temperature higher than a predetermined temperature during the execution of the stoichiometrical feed back control, the stoichiometrical feed back control is prohibited to deteriorate (control means) exhaust gas components flowing into the absorption-type NOx catalyst 33 (the exhaust emission control catalyst device 13).

More specifically, the three way catalyst 32 and the absorption-type NOx catalyst 33 have different purifying mechanisms, and thus their heat-resisting temperatures at which the heat deterioration starts are different. The heat-resisting temperature of the three way catalyst 32 is higher than that of the absorption-type NOx catalyst 33. The NOx absorbing function of the absorption-type NOx catalyst 33 is deteriorated since the execution of the stoichiometrical feedback control in a certain operating range improves the purifying efficiency of the three way catalyst 32 to thereby improve the quality of the exhaust gas components flowing into the absorption-type NOx catalyst 33, and the absorbing material is destabilized since it cannot form the carbonate or the nitrate. Therefore, if the temperature of the absorption-type NOx catalyst 33 exceeds the heat-resisting temperature, the exhaust gas components flowing into the absorption-type NOx catalyst 33 are deteriorated more than the exhaust gas components flowing during the execution of the stoichiometrical feed back control, and CO, H2, NOx, O2, THC, and the like are supplied to the absorbing material to thereby stabilize the absorption-type NOx catalyst 33 and prevent the heat deterioration. To deteriorate the exhaust gas components flowing into the absorption-type NOx catalyst 33, a feed back control is executed in such a manner as to make a reference air-fuel ratio slightly rich or slightly lean with respect to the stoichiometrical air-fuel ratio, or a lean air-fuel ratio control is executed.

There will now be described the heat deterioration control of the exhaust emission control device with reference to a flow chart of FIG. 2.

As shown in FIG. 2, a catalyst temperature Tcat 1 of the three way catalyst 32 estimated according to the output of the high temperature sensor 14 is compared with a predetermined temperature T1 in a step S1. The predetermined temperature T1 is a temperature at which there is the possibility of heat-deteriorating the three way catalyst 32 if the engine 1 is operated continuously. Thus, if the catalyst temperature Tcat 1 of the three way catalyst 32 is not less than the predetermined temperature T1 (catalyst deterioration determination means) in the step S1, the process goes to a step S2 to execute the stoichiometrical feed back control in such a manner as to make the air-fuel ratio of the engine 1 substantially stoichiometrical. Thus, the exhaust gas atmosphere flowing into the three way catalyst 32 never becomes the oxide atmosphere, and this prevents the heat deterioration.

Since the three way catalyst 32 and the absorption-type NOx catalyst 33 have different purifying mechanisms, the heat deterioration of the absorption-type NOx catalyst 33 proceeds even if the stoichiometrical feed back control is executed. To address this problem, a catalyst temperature Tcat 2 of the absorption-type NOx catalyst 33 is compared with a catalyst heat-resisting temperature T2 of the absorption-type NOx catalyst 33 during the execution of the stoichiometrical feed back control. If the catalyst temperature Tcat 2 exceeds the catalyst heat-resisting temperature T2, the absorbing material of the absorption-type NOx catalyst 33 may be destabilized to deteriorate the absorbing performance (the heat deterioration). Thus, if the catalyst temperature Tcat 2 of the absorption-type NOx catalyst 33 is in excess of the catalyst heat-resisting temperature T2 in the step S3 (catalyst deterioration determination means), the process goes to a step S4 to prohibit the feedback control and make the reference air-fuel ratio slightly rich. Therefore, CO, H2 and THC are supplied to the absorbing material of the absorption-type NOx catalyst 33 to generate carbonate and stabilize the absorbing material and prevent the heat deterioration. On the other hand, the catalyst temperature Tcat 2 of the absorption-type NOx catalyst is not more than the catalyst heat-resisting temperature T2 in the step S3, the process goes out of this routine without doing anything.

To deteriorate the exhaust gas components flowing into the absorption-type NOx catalyst 33 in order to prevent the heat deterioration resulting from the destabilization of the absorption-type NOx catalyst 33, the stoichiometrical feedback control is prohibited to make the reference air-fuel ratio slightly rich in the above-described embodiment. The reference air-fuel ratio, however, may be slightly lean, and in this case, NOx and O2 are supplied to the absorbing material of the absorption-type NOx catalyst 33 to generate carbonate and stabilized the absorbing material.

The three way catalyst 32 disposed just at the downstream of the exhaust pipe 11 is heated by the exhaust gas and is quickly activated when the engine 1 is cold-started. Taking into consideration the fact that the three way catalyst 34 is provided just at the downstream of the absorption-type NOx catalyst 33, the exhaust pipe 11 may be provided with a bypass passage and a bypass valve for bypassing the three way catalyst 32 so that the exhaust gas can flow directly into the absorption-type NOx catalyst 33 through the bypass passage when the catalyst temperature Tcat is increased. This prevents the heat deterioration of the three way catalyst 32, and stabilizes the absorbing material by supplying the absorption-type NOx catalyst 33 with HC, O2 and NOx in the exhaust gas with the substantially stoichiometrical air-fuel ratio.

The first embodiment has been explained on the assumption that the three way catalyst 32 and the absorption-type NOx catalyst 33 as the exhaust emission control device of the present invention are provided during the design of the internal combustion engine. As is case with the prior art, however, the internal combustion engine, which controls the heat deterioration by the three way catalyst 32 and the stoichiometrical feedback control, may also a feedback control for making the reference air-fuel ratio slightly rich or slightly lean and a lean air-fuel ratio control in order to deteriorate the exhaust gas components of the absorption-type NOx catalyst 33.

According to the first embodiment, the three way catalyst 32 and the absorption-type NOx catalyst 33 (the exhaust emission control catalyst device 13) are separately provided in the exhaust pipe 11. It is also possible to integrate three way catalyst 32 and the absorption-type NOx catalyst 33 into an absorption-type NOx catalyst having a three way function. As in the case where the three way catalyst is provided at the upstream, the three way function of the catalyst may stabilize the absorbing material in the execution of the stoichiometrical feed back control. To address this problem, the air-fuel ratio is controlled according to the estimated catalyst temperature to thereby prevent the heat deterioration. It is also possible to provide the three way catalyst 32, the absorption-type NOx catalyst 33 and the three way catalyst 34 in one catalyst device.

According to the first embodiment, the engine 1 is the cylinder fuel injection type spark ignition serial four cylinder engine, but the engine 1 may also be an intake pipe injection type lean burn engine on condition that the engine 1 has the absorption-type NOx catalyst.

Figure 3:
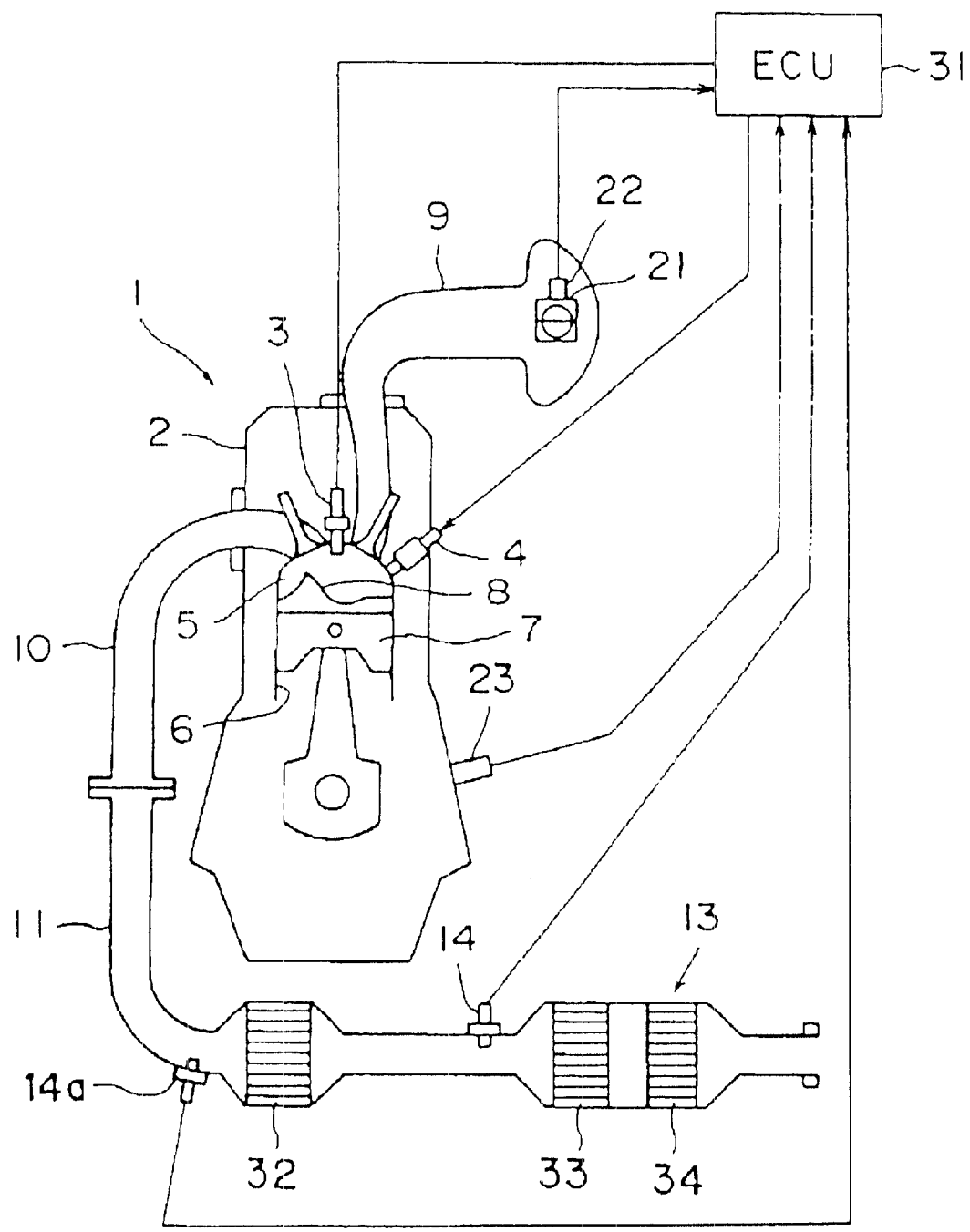
FIG. 3 is a schematic diagram showing the structure of an exhaust emission control device of an internal combustion engine according to the second embodiment of the present invention.
Figure 4:
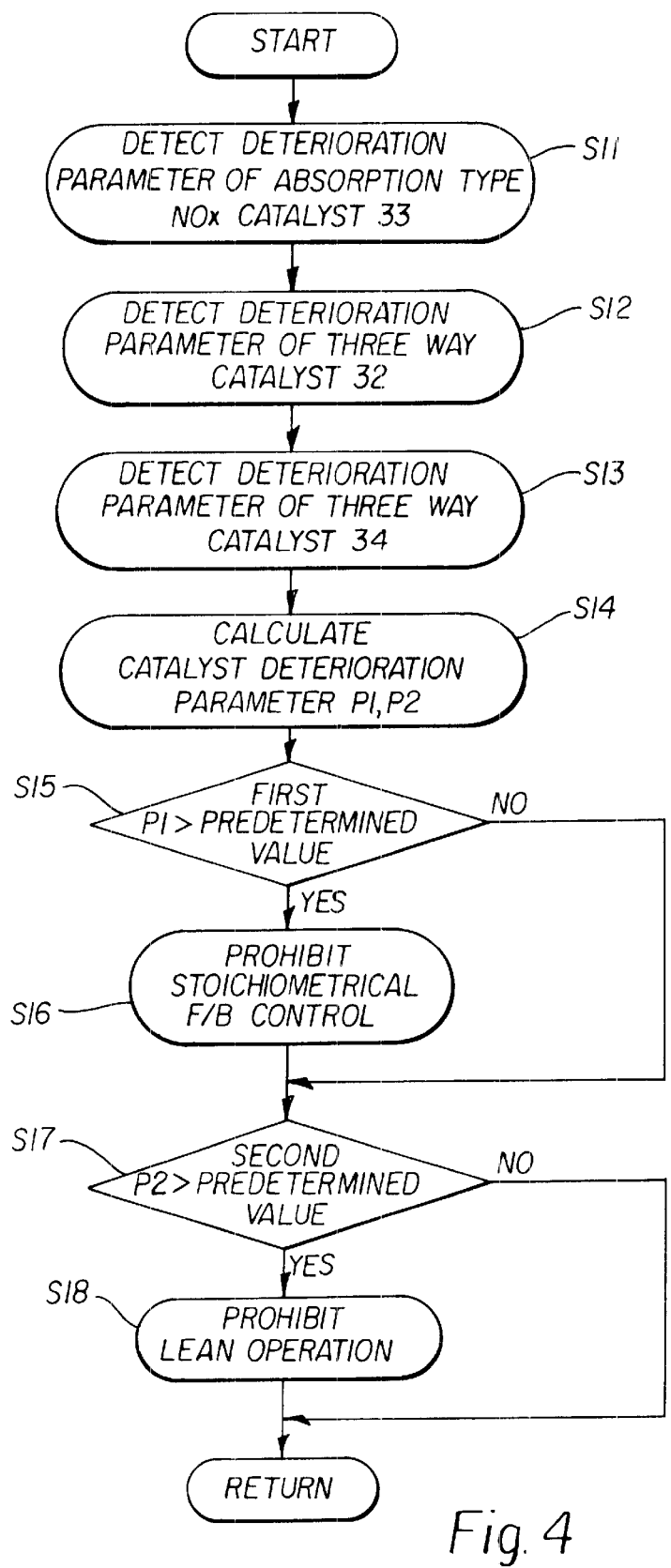
FIG. 4 is a flow chart showing a procedure for controlling deterioration by means of the exhaust emission control device of the internal combustion engine in FIG. 3.

Referring next to FIGS. 3–9, there will now be described the second embodiment of the present invention. In the second embodiment, a spark ignition multiple cylinder fuel injection type internal combustion engine, which controls the air-fuel ratio of the mixture closer to the lean air-fuel ratio than to the stoichiometrical air-fuel ratio and inject fuel into a combustion chamber will be described as an example. FIG. 3 is a schematic diagram showing the structure of the internal combustion provided with the exhaust emission control device according to the second embodiment of the present invention, FIG. 4 is a flow chart showing a procedure for controlling deterioration by means of the exhaust emission control device of the internal combustion engine in FIG. 3; FIG. 5 shows deterioration indexes of an absorption-type NOx catalyst that is used when the exhaust emission control device of the internal combustion engine in FIG. 3 controls the deterioration; and FIG. 6 shows deterioration indexes of a three way catalyst that is used when the exhaust emission control device of the internal combustion engine in FIG. 3 controls the deterioration.

For example, a cylinder fuel injection type spark ignition serial four cylinder gasoline engine 1 (hereinafter referred to as an engine 1), which injects fuel directly into a combustion chamber, is used as the multiple cylinder fuel injection type internal combustion engine. The engine 1 is able to inject the fuel in both an intake stroke (an intake stroke injection mode) and a compression stroke (a compression stroke injection mode) by switching a combustion mode (operating mode). The engine 1 can be run at a substantially stoichibmetrical air-fuel ratio, a rich air-fuel ratio and a lean air-fuel ratio. Particularly in the compression stroke injection node, the engine 1 can be run at a super lean air-fuel ratio. Particularly in the compression stroke injection mode, the engine 1 can be run at a super lean air-fuel ratio which is higher than the lean air fuel ratio in the intake stroke.

In each cylinder, an ignition plug 3 is attached to a cylinder head 2 of the engine 1 as shown in FIG. 3, and an electromagnetic fuel injection valve 4 is attached to each cylinder. An injection opening of the fuel injection valve 4 is opened in a combustion chamber 5, and fuel injected from the fuel injection valve 4 is directly injected into the combustion chamber 5. A cylinder 6 of the engine 1 supports a piston 7 in such a manner that the piston 7 can freely slide vertically. A cavity, which is caved in the shape of a hemisphere, is formed on the top face of the piston 7. In FIG. 3, the cavity 8 generates a reverse tumble flow in a counterclockwise direction.

In each cylinder, an intake port is formed in substantially an upright direction at the cylinder head 2, and one end of an intake manifold 9 is connected to the cylinder head 2 in such a manner as to communicate with each intake port. A drive-by-wire (DBW) electric throttle valve 21 (ETV) connects to the other end of the intake manifold 9, and the throttle valve 21 is provided with a throttle sensor 22 that senses a throttle opening θth. The engine 1 is provided with a crank angle sensor 23 that senses a crank angle. The crank angle sensor 23 is capable of sensing an engine revolution speed Ne.

An exhaust port is formed in substantially a horizontal direction at the cylinder head 2 in each cylinder, and one end of an exhaust manifold 10 connects to the cylinder head 2 in such a manner as to communicate with each exhaust port. The exhaust manifold 10 is provided with an EGR drive (not shown). On the other hand, the exhaust manifold 10 connects to an exhaust pipe 11, which connects to a muffler (not shown) through a small three way catalyst 32 and an exhaust emission control catalyst device 13, which are disposed adjacent to the engine 1.

The three way catalyst 32 is quickly activated by heating by an exhaust gas when the engine 1 is cold-started. The three way catalyst 32 purifies harmful substance (HC, CO, NOx), and has platinum (Pt), rhodium (Rh) and the like as noble metal.

High temperature sensors (catalyst temperature sensing means) 14, 14a are provided between the three way catalyst 32 and the exhaust emission control catalyst device 13 in the exhaust pipe 11. The high temperature sensors 14, 14a are positioned at the upstream of the exhaust emission control catalyst device 13, i.e., at the upstream of an absorption-type NOx catalyst 33 as an NOx trap catalyst that will be described later and the three way catalyst 32. The exhaust emission control catalyst device 13 has an absorbing, emitting and reducing function of absorbing NOx in the exhaust gas and emitting the absorbed NOx in reducing atmosphere where CO mainly exists to reduce the NOx into nitrogen (N2nd the like when the exhaust air-fuel ratio is the lean air-fuel ratio, and a reducing function of purifying harmful substance (HC, CO, NOx) in the exhaust gas when the exhaust air-fuel ratio is substantially stoichiometrical. More specifically, the exhaust emission control catalyst device 13 has the absorption-type NOx catalyst 33 for executing the absorbing, emitting and reducing function, and the three way catalyst 34 for executing the three way function. The three way catalyst 34 is disposed at the downstream of the absorption-type NOx catalyst 33.

The absorption-type NOx catalyst 33 has platinum (Pt) and rhodium (Rh) as noble metal as noble metal, and has absorbing material made of alkali metal and alkali earth metal such as barium (Ba). When the absorption-type NOx catalyst 33 emits the absorbed NOx, the three way catalyst 34 reduces the NOx that cannot be reduced by the absorption-type NOx catalyst itself. If the absorption-type NOx catalyst 33 reduces the NOx, and sufficiently functions as the three way catalyst that oxidizes HC and CO, the exhaust emission control catalyst device 13 may be composed only of the absorption-type NOx catalyst 33.

A vehicle is provided with an electronic control unit (ECU) 31. The ECU 31 is provided with an input/output device; a storage device for containing a control program, a control map and the like; a central processing unit; a timer; a counter and the like. The ECU 31 totally controls the exhaust emission control device of the present embodiment including the engine 1. Sensor information from a variety of sensors is inputted to the ECU 31, which determines a fuel injection mode, a fuel injection amount, an ignition timing and the like and controls the fuel injection valve 4, the ignition plug 3 and the like.

In the engine 1, an intake flow flowing into the combustion chamber 5 from the intake manifold 9 forms a reverse tumble flow, and the fuel is injected from the middle of the compression stroke to gather a small amount of fuel only in close proximity to the ignition plug 3 disposed at the center of the top of the combustion chamber 5 by using the reverse tumble flow, thereby obtaining an extremely lean air-fuel ratio in a part withdrawn from the ignition plug 3. Making the air-fuel ratio substantially stoichiometrical or rich only in close proximity to the ignition plug 3 realizes stable laminar combustion (laminar super lean combustion) and controls the fuel consumption.

To obtain a high output from the engine 1, the fuel from the fuel injection valve 4 is injected to the intake stroke to thereby make uniform the fuel over the entire combustion chamber 5 and obtain a mixture with the substantially stoichiometrical and rich air-fuel ratios inside the combustion chamber 5. A premixed combustion is performed in this state. Of course, a higher output can be obtained if the air-fuel ratio is stoichiometrical or rich than if the air-fuel ratio is lean. Thus, the fuel is injected in such a timing as to sufficiently atomize and mix the fuel to thereby obtain a high output efficiently.

The ECU 31 finds a target cylinder inner pressure, i.e., a target average effective pressure Pe corresponding to an engine load according to the throttle opening information θth from the throttle sensor 22 and the engine revolution speed information Ne from the crank angle sensor 23. Moreover, the ECU 31 determines the fuel injection mode with reference to a map (not shown) according to the target average effective pressure Pe and the engine revolution speed information Ne. If, for example, both the target average effective pressure Pe and the engine revolution speed Ne are low, the compression stroke injection mode is determined as the fuel injection mode so that the fuel can be injected in the compression stroke. On the other hand, if the target average effective pressure Pe or the engine revolution speed Ne is high, the intake stroke injection mode is determined as the fuel injection mode so that the fuel can be injected in the intake stroke. A target air-fuel ratio (a target A/F) as a control objective is determined according to the target average effective pressure Pe and the engine revolution speed Ne, and a proper injection amount of fuel is determined according to the target A/F.

A catalyst temperature Tcat is estimated from exhaust gas temperature information sensed by the high temperature sensors 14, 14a. More specifically, a temperature difference map is produced by an experiment and the like according to the target average effective pressure Pe and the engine revolution speed information Ne in order to correct an error resulting from the fact that the high temperature sensor 14 and the absorption-type NOx catalyst 33 are a little apart from each other. The catalyst temperature Tcat is univocally estimated upon determination of the target average effective pressure Pe and the engine revolution speed information Ne. Additionally, the flow rate of exhaust gas and the components of exhaust gas are represented in the map. It is possible to estimate the flow rate of the exhaust gas according to information from an intake amount sensor (not shown), and it is possible to additionally provide a sensor for directly sensing the condition of the exhaust gas components.

In the exhaust emission control device of the internal combustion engine that is constructed in the above-mentioned manner, the three way catalyst 32 is heated by the exhaust gas and is quickly activated when the engine 1 is cold-started. When the exhaust air-fuel ratio is substantially stoichiometrical, the three way catalyst 32 purifies the harmful substance (HC, CO, NOx) in the exhaust gas.

In the exhaust emission control catalyst device 13, the absorption-type NOx catalyst 33 absorbs the NOx as nitrite in the exhaust gas to purify the exhaust gas in the atmosphere with an excessive oxygen concentration, e.g., while the engine is run at the super lean air-fuel ratio in a lean mode. On the other hand, in the atmosphere with a low oxygen concentration, the nitrite absorbed into the absorption-type NOx catalyst 33 reacts with the CO in the exhaust gas to generate carbonate and the NOx is emitted. Therefore, as the absorption of the NOx into the absorption-type NOx catalyst 33 proceeds, the air-fuel ratio is made rich or additional fuel is injected to emit and reduce the NOx from the absorption-type NOx catalyst 33, thus maintaining the NOx reducing function.

As is the case with the three way catalyst 32, the three way catalyst 34 of the exhaust emission control catalyst device 13 purifies the harmful substance (HC, CO, NOx) in the exhaust gas when the exhaust air-fuel ratio is substantially stoichiometrical. When the absorption-type NOx catalyst 33 emits the absorbed NOx, the three way catalyst 34 reduces the NOx that cannot be reduced by the absorption-type NOx catalyst 33 itself.

Under the control of the exhaust emission control device of the internal combustion engine according to the second embodiment, the temperature of the exhaust gas, the flow rate of the exhaust gas and the components of the exhaust gas are set at the optimum values (the operating state is switched to the optimum state) to thereby control the heat deterioration of the three way catalyst 32, the absorption-type NOx catalyst 33 and the three way catalyst 34.

The three way catalyst and the absorption-type NOx catalyst differ in their heat-resisting temperature. The three way catalyst is oxidized and deteriorated when the exhaust gas becomes lean atmosphere, whereas the absorbing material of the absorption-type NOx catalyst does not become carbonate or nitrite (or acid oxide) when the exhaust gas becomes substantially stoichiometrical atmosphere to decrease CO, THC and the like. Thus, the absorbing material is destabilized and cannot absorb NOx by combining with a carrier (deterioration). Particularly if the flow rate of exhaust gas is high, the oxidization is advanced to affect the deterioration of the three way catalyst. If the flow rate of exhaust gas is low, the CO and the THC run short to affect the deterioration of the absorption-type NOx catalyst. In other words, the absorption-type NOx catalyst 33 and the three way catalyst 32 (the three way catalyst 34) have opposite deterioration characteristics with respect to the flow rate of the exhaust gas.

Therefore, deterioration parameters of the absorption-type NOx catalyst 33 and the three way catalyst 32 (the three way catalyst 34) with respect to the temperature of the exhaust gas, the flow rate of the exhaust gas and the components of the exhaust gas are found (deterioration parameter finding means). A deterioration parameters are found from the deterioration indexes of the absorption-type NOx catalyst 33 with respect to the temperature of the exhaust gas, the flow rate of the exhaust gas and the components of the exhaust gas, and a deterioration parameter is found from the deterioration indexes of the three way catalyst 32 (the three way catalyst 34) with respect to the temperature of the exhaust gas, the flow rate of the exhaust gas and the components of the exhaust gas. According to each deterioration parameter, the operating range is switched to the optimum region to control the deterioration.

More specifically, if the deterioration parameter (deterioration index) of the absorption-type NOx catalyst 33 exceeds a predetermined value (the first predetermined value) for the NOx catalyst, the engine 1 is prohibited from operating at the substantially stoichiometrical air-fuel ratio. If the deterioration parameter (deterioration index) of the three way catalyst 32 (the three way catalyst 34) exceeds a predetermined value (the second predetermined value) for the three way catalyst, the engine 1 is prohibited from operating at the lean air-fuel ratio (air-fuel ratio control means). This controls the heat deterioration of the absorption-type NOx catalyst 33 and the three way catalyst 32 (the three way catalyst 34) having opposite deterioration characteristics without deteriorating the fuel economy.

Referring next to a flow chart of FIG. 4, there will be described a procedure for controlling the deterioration in the exhaust emission control device.

As shown in FIG. 4, the deterioration indexes of the absorption-type NOx catalyst 33 are sensed in a step S1 according FIG. 5, the deterioration indexes of the three way catalyst 32 are detected in a step S12 according to FIG. 6, and the deterioration indexes of the three way catalyst 34 are detected in a step S13 according to FIG. 6. More specifically, the deterioration index P1A with respect to the catalyst temperature, the deterioration index P1B with respect to the flow rate of the exhaust gas and the deterioration index P1C with respect to the components of the exhaust gas in the absorption-type NOx catalyst 33 are determined as shown in FIG. 5. The deterioration index P2A with respect to the catalyst temperature, the deterioration index P2B with respect to the flow rate of the exhaust gas and the deterioration index P2C with respect to the components of the exhaust gas in the three way catalyst 32 and the three way catalyst 34 are determined as shown in FIG. 5.

Figure 5A:
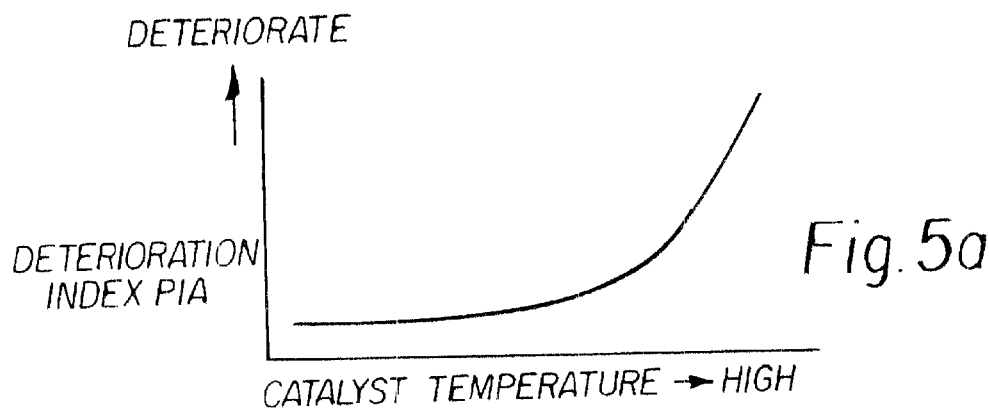
FIG. 5 shows deterioration indexes of an absorption-type NOx catalyst that is used when the exhaust emission control device of the internal combustion engine in FIG. 3 controls the deterioration.
Figure 5B:
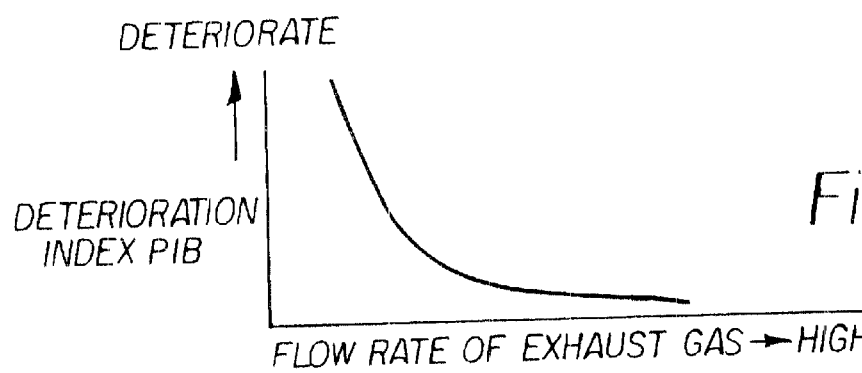
Figure 5C:
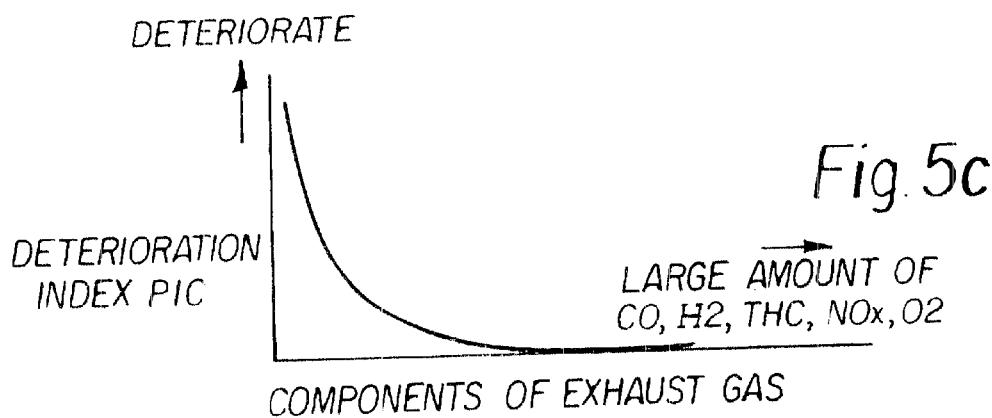
Figure 6A:
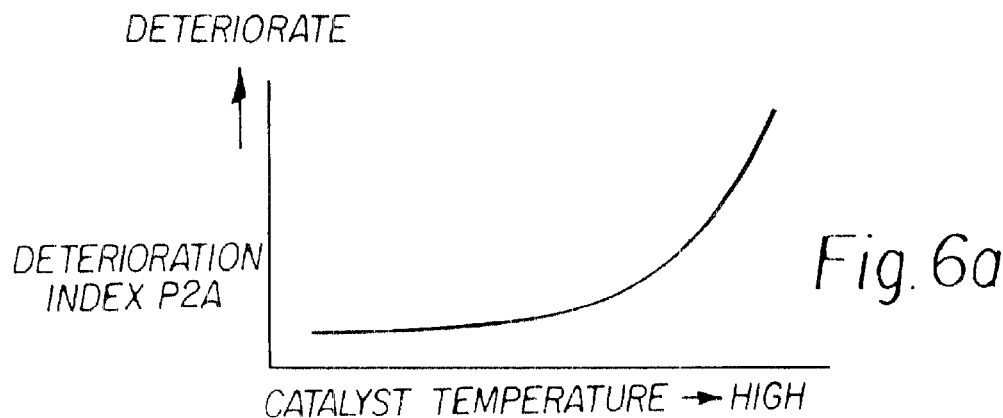
FIG. 6 shows deterioration indexes of a three way catalyst that is used when the exhaust emission control device of the internal combustion engine in FIG. 3 controls the deterioration.
Figure 6B:
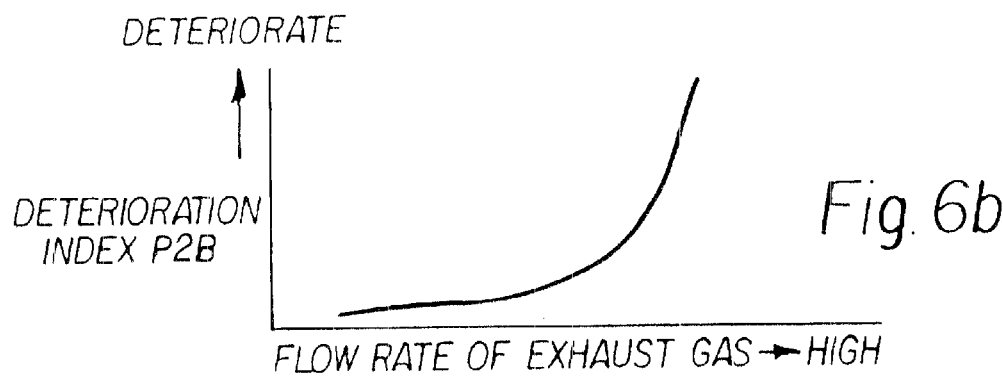
Figure 6C:
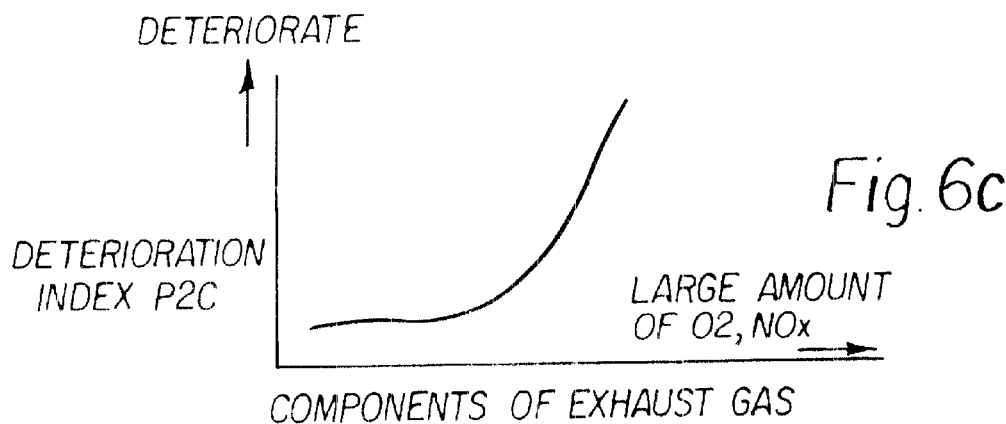

As shown in FIG. 5(a) and FIG. 6(a), the deterioration indexes of the absorption-type NOx catalyst and the three way catalysts 32, 34 are deteriorated with the rise in the catalyst temperature. As shown in FIG. 5(b) and FIG. 6(b), the deterioration indexes of the absorption-type NOx catalyst are deteriorated if there is a low flow rate of exhaust gas, whereas the deterioration indexes of the three way catalysts 32, 34 are deteriorated if three is a high flow rate of exhaust gas. As shown in FIG. 5(c) and FIG. 6(c), the deterioration indexes of the absorption-type NOx catalyst are deteriorated if there is a small amount of CO, H2, TCH, NOx and O2 as the components of the exhaust gas, whereas the deterioration indexes of the three way catalysts 32, 34 are deteriorated if there is a large amount of O2 and NOx.

The deterioration indexes P1A, P1B and P1C are detected in the step S11 according to FIG. 5, and the deterioration indexes P2A, P2B and P2C are detected in the steps S12 and S13 according to FIG. 6. Upon the detection of these deterioration indexes, deterioration parameters P1 and P2 are calculated in a step S14. The deterioration parameter P1 is a deterioration parameter of the absorption-type NOx catalyst 33, which is calculated according to the deterioration indexes P1A, P1B and P1C. The deterioration parameter P2 is a deterioration parameter of the three way catalysts 32 and 33, which is calculated according to the deterioration indexes P2A, P2B and P2C.

For example, the deterioration parameter P1 is calculated according to the equation (deterioration index P1A×deterioration index P1B×deterioration index P1C) or the equation {deterioration index P1A×(deterioration index P1B×deterioration index P1C)}. Similarly, the deterioration parameter P2 is calculated according to the equation (deterioration index P2A×deterioration index P2B×deterioration index P2C) or the equation {deterioration index P2A×(deterioration index P2B×deterioration index P2C)}. It is also possible to give a weight in the calculation by the property of the catalyst and the like. It is necessary to use at least one deterioration index in order to calculate the deterioration parameter.

After the deterioration parameters P1 and P2 are calculated in the step S14, i.e., if the deterioration tendency of the absorption-type NOx catalyst 33 and the three way catalysts 32 and 24 are found, it is determined in a step S15 whether the deterioration parameter P1 is in excess of the first predetermined value or not. If it is determined in the step S15 that the deterioration parameter P1 is in excess of the first predetermined value, a stoichiometrical feed back (stoichiometrical F/B) operation is prohibited in a step S16. More specifically, if the catalyst temperature is high, there is a low flow rate of exhaust gas and there is a small amount of CO, H2, TCH, NOx and O2 as the components of the exhaust gas; it is determined that the absorption-type NOx catalyst 33 has the tendency to deteriorate easily. If there is a small amount of CO, H2, TCH, NOx and O2 as the components of the exhaust gas, the stoichiometrical F/B is prohibited to control the deterioration of the absorption-type NOx catalyst 33.

After the stoichiometrical F/B operation is prohibited in a step S16, or if it is determined in the step S15 that the deterioration parameter P1 is not in excess of the NOx predetermined value; it is determined in a step S17 whether the deterioration parameter P2 is in excess of the second predetermined value or not. If it is determined in the step S17 that the deterioration parameter P2 is in excess of the second predetermined value, a lean operation is prohibited in a step S18. If the catalyst temperature is high, there is a high flow rate of exhaust gas and there is a large amount of NOx and O2 as the components of exhaust gas; it is determined that the three way catalysts 32, 34 have the tendency to deteriorate easily. Then, the lean operation with a large amount of NO2 and O2 is prohibited to control the deteriation of the three way specifically, if the deterioration parameter P1 is in excess of the first predetermined value and the deterioration parameter P2 is in excess of the second predetermined value, the stoichiometrical F/B and the lean operation are prohibited to perform a rich operation in order to control the deterioration of the absorption-type NOx catalyst 33 and the three way catalysts 32, 34. If the deterioration parameter P1 is in excess of the first predetermined value but the deterioration parameter P2 is not in excess of the second predetermined value, only the stoichiometrical F/B is prohibited to enable the lean operation or the rich operation. If the deterioration parameter P1 is not in excess of the first predetermined value but the deterioration parameter P2 is in excess of the second predetermined value, only the lean operation is prohibited to enable the stoichiometrical F/B or the rich operation. If the deterioration parameter P1 is not in excess of the first predetermined value and the deterioration parameter P2 is not in excess of the second predetermined value, neither the stoichiometrical F/B nor the lean operation is prohibited to enable the stoichiometrical F/B, the lean operation and the rich operation.

When the stoichiometrical F/B is prohibited, it is possible to use a means for increasing the amount of CO, H2, TCH, NOx and O2, lowering the temperature of the catalyst by cooling and raising the flow rate of the exhaust gas. When the lean operation is prohibited, it is possible to use a means for decreasing the amount of NOx and O2, lowering the temperature of the catalyst by cooling and lowering the flow rate of the exhaust gas. In this case, the second predetermined value may be set separately.

As stated above, the operating state is controlled to the state wherein the catalyst with a higher deterioration parameter, i.e., the catalyst having a higher deterioration parameter found from the catalyst temperature, the flow rate of the exhaust gas and the components of the exhaust gas and having the tendency to deteriorate easily is given priority in the control of the deterioration. If the catalysts have high deterioration parameters P1 and P2, i.e, the deterioration parameters found from the catalyst temperature, the flow rate of the exhaust gas and the components of the exhaust gas and have the tendency to deteriorate easily, the engine 1 is prohibited at the lean air-fuel ratio and the substantially stoichiometrical air-fuel ratio so as to control the deterioration of the absorption-type NOx catalyst 33 and the three way catalysts 32, 34. Therefore, the operating range is only restricted to the rich air-fuel ratio if the absorption-type NOx catalyst 33 and the three way catalysts 32, 34 have the tendency to deteriorate easily. This efficiently controls the deterioration of the absorption-type NOx catalyst 33 and the three way catalysts 32, 34 having different deterioration characteristics without deteriorating the fuel economy.

Figure 7:
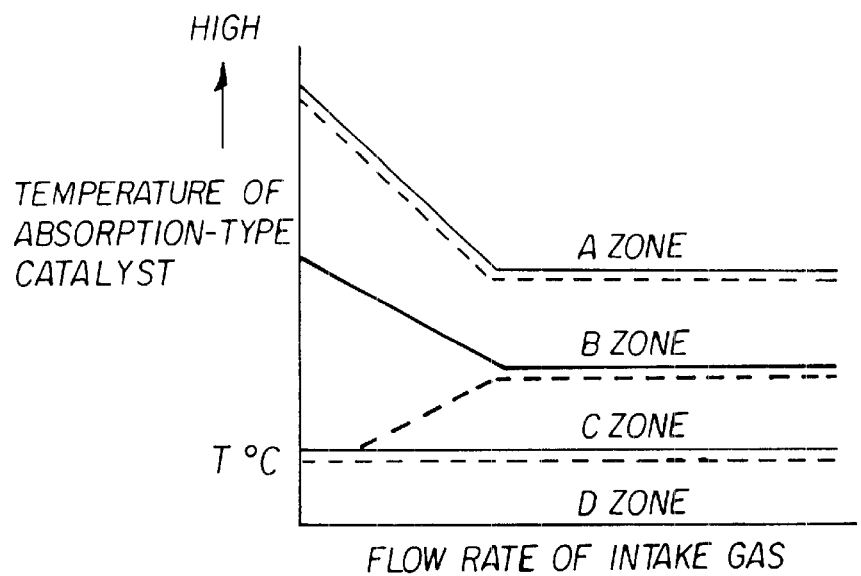
FIG. 7 shows a map representing operating ranges of the absorption-type NOx catalyst that is used when the exhaust emission control device of the internal combustion engine according to the third embodiment of the present invention controls the deterioration.
Figure 8:
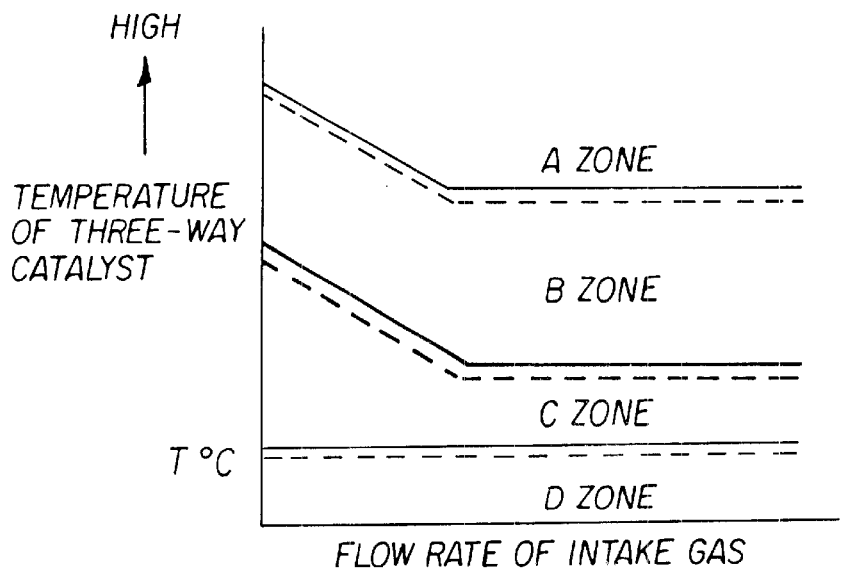
FIG. 8 shows a map representing operating ranges of the three way catalyst that is used when the exhaust emission control device of the internal combustion engine according to the third embodiment of the present invention controls the deterioration.

Referring next to FIGS. 7 and 8, there will be described a procedure for controlling the deterioration according to another embodiment. According to this embodiment, the operating ranges of the engine 1, which is determined according to the deterioration parameters of the absorption-type NOx catalyst 33 and the three way catalysts 32, 34 found from the catalyst temperature and the flow rate of the exhaust gas (flow rate of intake gas) are represented as a map with the catalyst temperature and the flow rate of the exhaust gas being parameters (operating range setting means). According to the map, the engine 1 is operated in such an operating range as to control the deterioration. Therefore, the heat deterioration of the absorption-type NOx catalyst 33 and the three way catalysts 32, 34 is controlled.

FIG. 7 shows a map of a relationship between the catalyst temperature and the flow rate of intake gas for the representation of the operating ranges of the absorption-type NOx catalyst 33. FIG. 8 shows a map of a relationship between the catalyst temperature and the flow rate of the intake gas for the representation of the operating ranges of the three way catalysts 32, 34.

As shown in FIGS. 7 and 8, the operating range for controlling the deterioration is determined according to the relationship between the catalyst temperature and the flow rate of the intake gas with respect to the absorption-type NOx catalyst 33 and the three way catalysts 32, 34. More specifically, the operating range is divided into a B zone, a C zone and a D zone according to the catalyst temperature and the flow rate of the intake gas at a predetermined temperature T° C. or higher. Solid lines at boundaries between the zones indicate boundaries where the zones are switched from the low temperature side to the high temperature side. Dotted lines indicate boundaries with hysteresis where the zones are switched from the high temperature side to the low temperature side.

The A zone is in an open loop mode with the rich air-fuel ratio and a high catalyst temperature. A/F is not greater than a predetermined value (e.g., 13). The B zone is a zone that achieves a slightly richer air-fuel ratio than the stoichiometrical air-fuel ratio by the stoichiometrical F/B+a rich shift. An F/B gain is determined separately from a normal stoichiometrical F/B. The C zone is normally in a lean mode at the lean air-fuel ratio. If, however, a target A/F<the predetermined value (including stoichiometrical F/B+rich shift) passes for more than thirty seconds, the stoichiometrical F/B+the rich shift is executed for a predetermined period of time (e.g., five seconds) and then the rise in the temperature of the catalyst in the lean mode is prevented.

If the speed is accelerated in this region, the stoichiometrical F/B+the rich shift is executed, and the F/B gain is determined separately. The D zone is a zone where a high load open loop mode is prohibited.

Figure 9:
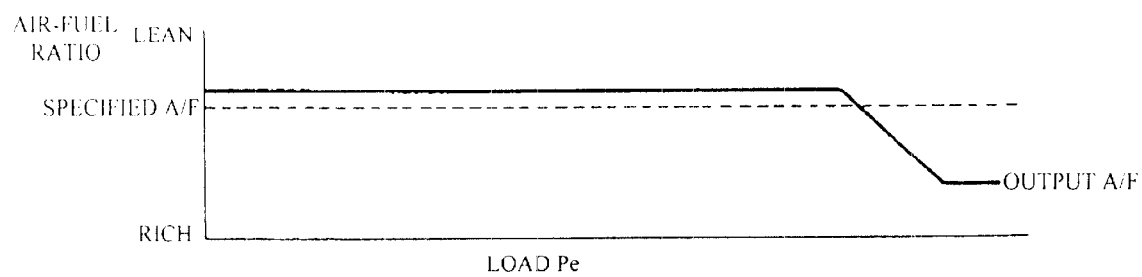
FIG. 9 shows a relationship between an air-fuel ratio and a load in the exhaust emission control device of the internal combustion engine according to the third embodiment of the present invention.

If, however, determined A/F is not greater than specified A/F (e.g., 13.8) as shown in FIG. 9, the open loop mode is set and the target A/F is determined as being not greater than the determined A/F. A start mode, a fail mode and a fuel cut mode are excluded. Therefore, the fuel economy is improved in the B zone compared with the A zone and in the C zone compared with the B zone. The D zone controls the fuel economy within such a range as not to sacrifice the drivability.

According to the present embodiment, the operating range of the engine 1 is divided into four regions, but it is also possible to divide the operating range of the engine 1 into more than four regions and to set a region of the stoichiometrical air-fuel ratio. According to the present embodiment, the operating range for controlling the deterioration of the catalyst at the predetermined temperature T° C. or higher is set, but it is also possible to set an operating range for controlling the deterioration in all temperature regions including a low temperature region.

If the flow rate of the intake gas is low, the absorption-type NOx catalyst 33 is easily deteriorated. Therefore, the lean mode is executed (the region of the C zone is broadened) to control the deterioration of the absorption-type NOx catalyst 33. If the flow rate of the intake gas is high, a non-lean mode of the B zone as a mode at the rich side is executed the while the catalyst temperature is low. This controls the deterioration of the three way catalysts 32, 34. If the zones selected in FIG. 7 and FIG. 8 are different from the zone found from each catalyst temperate; the A zone, the B zone, the C zone and the D zone are given priority in that order (if the B zone is selected in FIG. 7 and the C zone is selected in FIG. 8, the B zone is given priority).

Thus, as shown. in FIGS. 7 and 8, the operating ranges are divided into the A zone, the B zone, the C zone and the D zone and the zone is selected according to the catalyst temperature and the flow rate of the intake gas (the flow rate of the exhaust gas), the operating range where the catalyst having the tendency to deteriorate easily is given priority in the control of the deterioration is selected. This efficiently controls the deterioration of the absorption-type NOx catalyst 33 and the three way catalysts 32, 34 without deteriorating the fuel economy.

As shown in FIG. 7, the dotted line is inclined toward the low temperature side in the region with the low flow rate of the intake gas at a point where the B zone at the high temperature side is switched to the C zone at the low temperature side at the boundary between the B zone and the C zone. The reason for this is as follows. The absorption-type NOx catalyst 33 in the B zone becomes the carbonate due to the rich operation, and the flow rate of the exhaust gas is low. Thus, there is a small amount of new CO, O2 and NOx even if the catalyst temperature is low and the air-fuel ratio is lean. For this reason, the carbonate is emitted if the air-fuel ratio is immediately switched to the lean air-fuel ratio, and thus, the rich air-fuel ratio is maintained at the low temperature side to prevent the emission of the carbonate and control the deterioration.

On the other hand, the solid line is inclined toward the high temperature side in the region with the low flow rate of the intake gas at a point where the C zone at the low temperature side is switched to the B zone at the high temperature side at the boundary between the B zone and the C zone. The reason for this is as follows. The absorption-type NOx catalyst 33 in the C zone becomes the nitrite due to the lean operation, and the flow rate of the exhaust gas is low. Thus, there is a small amount of new CO, O2 and NOx even if the catalyst temperature is low and the air-fuel ratio is lean. For this reason, O2 is emitted if the air-fuel ratio is immediately switched to the rich air-fuel ratio, and thus, the stable state at the rich air-fuel ratio is maintained at the low temperature side to control the deterioration.

According to the second embodiment, the three way catalyst 32 and the exhaust emission control device 13 are provided separately in the exhaust pipe 11, but the three way catalyst 32, the absorption-type catalyst 33 and the three way catalyst 34 are provided in one catalyst device. It is also possible to integrate the three way catalyst 32, the absorption-type catalyst 33 and the three way catalyst 34 by providing the absorption-type catalyst 33 with the three way function. The cylinder fuel injection engine 1 is used as the internal combustion engine, but it is also possible to apply the present invention to an intake pipe injection lean burn engine that has the three, way catalyst for purifying the exhaust gas and the absorption-type NOx catalyst for absorbing nitrogen oxide in the exhaust gas.

If an NOx selecting and reducing catalyst is additionally used, deterioration parameter and a map having the same tendency as the three way can be used since a deterioration characteristic of the NOx selecting and reducing catalyst is similar to that of the three way catalyst. According to the second embodiment, the parameters correlated to the catalyst temperature are estimated from the catalyst temperature and the exhaust gas temperature, but it is also possible to actually measure the catalyst temperature or to use an exhaust gas temperature detected value as it is or the corrected exhaust gas temperature corrected value. The detected value of the exhaust gas temperature. According to the second embodiment, the absorption-type NOx catalyst, which absorbs NOx in the lean atmosphere and emits and reduces the absorbed NOx in the substantially stoichiometrical atmosphere, is given as an example of the NOx trap catalyst, but it is also possible to use an NOx trap catalyst that absorbs NOx in the lean atmosphere and directly reduces the absorbed NOx in the rich or stoichiometrical atmosphere.

What is claimed is:

1. An exhaust emission control device of an internal combustion engine, which purifies exhaust gas exhausted from said internal combustion engine, said exhaust emission control device comprising:

a catalyst device composed of a three way catalyst for purifying harmful substance in the exhaust gas when an exhaust air-fuel ratio is substantially stoichiometrical and an NOx catalyst having a function of absorbing NOx in the exhaust gas when the air-fuel ratio is closer to a lean air-fuel ratio than to said stoichiometrical air-fuel ratio, said catalyst device being provided in an exhaust passage of said internal combustion engine;

catalyst deterioration determination means for determining a deterioration state of said catalyst device, said deterioration resulting from at least temperature; and control means for deteriorating exhaust gas components, wherein, when said catalyst device is in a predetermined deterioration state, the control means adjusts the air-fuel ratio so that a first quantity of exhaust gas components flowing into said catalyst device greatly exceeds a second quantity of exhaust gas components flowing into said catalyst device, wherein the second quantity of exhaust gas components is that which is produced when the air-fuel ratio is substantially stoichiometrical, wherein said catalyst deterioration determination means comprises:

deterioration parameter finding means for finding a deterioration parameter of said three way catalyst and a deterioration parameter of said NOx catalyst;

first deterioration determination means for determining that said three way catalyst is in a predetermined deterioration state when the deterioration parameter of said three way catalyst found by said deterioration parameter finding means is in excess of a reference value that is preset for said three way catalyst; and second deterioration determination means for determining that said NOx catalyst is in a predetermined deterioration state when the deterioration parameter of said NOx catalyst found by said deterioration parameter finding means is in excess of a reference value that is preset for said NOx catalyst, and wherein if said first deterioration determination means determines that said three way catalyst is in a predetermined deterioration state, said control means prohibits the air-fuel ratio of the mixture supplied to said internal combustion engine from being the lean air-fuel ratio, and if said second deterioration determination means determines that said NOx catalyst is in a predetermined deterioration state, said control means prohibits the air-fuel ratio of the mixture supplied to said internal combustion engine from being substantially stoichiometrical.

2. An exhaust emission control device of an internal combustion engine according to claim 1, wherein:

said deterioration parameter finding means finds the deterioration parameter of said three way catalyst by using a deterioration index corresponding to a temperature of said three way catalyst, and finds the deterioration index of said NOx catalyst by using a deterioration index corresponding to a temperature of said NOx catalyst.

3. An exhaust emission control device of an internal combustion engine according to claim 2; wherein:

the deterioration index corresponding to the temperature of said three way catalyst indicates that the higher the temperature of said three way catalyst is, the larger the deterioration degree of said three way catalyst is, and the deterioration index corresponding to the temperature of said NOx catalyst indicates that the higher the temperature of said NOx catalyst is, the larger the deterioration degree of said NOx catalyst is.

4. An exhaust emission control device of an internal combustion engine according to claim 1, wherein:

said deterioration parameter finding means finds the deterioration parameter of said three way catalyst by using at least one of a deterioration index corresponding to a flow rate of exhaust gas flowing into said three way catalyst and a deterioration index corresponding to components of exhaust gas flowing into said three way catalyst, and a deterioration index corresponding to a temperature of said three way catalyst, and finds the deterioration parameter of said NOx catalyst by using at least one of a deterioration index corresponding to a flow rate of said NOx catalyst and a deterioration index corresponding to components of exhaust gas flowing into said NOx catalyst, and a deterioration index corresponding to a temperature of said NOx catalyst.

5. An exhaust emission control device of an internal combustion engine according to claim 4, wherein:

the deterioration index corresponding to the flow rate of exhaust gas flowing into said three way catalyst indicates that the larger the flow rate of the exhaust gas is, the larger the deterioration degree of said three way catalyst is;

the deterioration index corresponding to the components of the exhaust gas flowing into said three way catalyst indicates that the leaner the exhaust air-fuel ratio is, the larger the deterioration degree of said three way catalyst is;

the deterioration index corresponding to the temperature of said three way catalyst indicates that the higher the temperature of said three way catalyst is, the deterioration degree of said three way catalyst is;

the deterioration index corresponding to the flow rate of the exhaust gas flowing into said NOx catalyst indicates that the lower the flow rate of the exhaust gas is, the larger the deterioration degree of said NOx catalyst is;

the deterioration index corresponding to the components of the exhaust gas flowing into said NOx catalyst indicates that the closer the exhaust air-fuel ratio is to the stoichiometrical air-fuel ratio, the larger the deterioration degree of said NOx catalyst is; and the deterioration index corresponding to the temperature of said NOx catalyst indicates that the higher the temperature of said NOx catalyst is, the larger the deterioration degree of said NOx catalyst is.

* * * * *